(12) United States Patent
Tanaka et al.

(10) Patent No.: US 9,441,514 B2
(45) Date of Patent: Sep. 13, 2016

(54) DIESEL ENGINE

(71) Applicant: KUBOTA Corporation, Osaka-shi, Osaka (JP)

(72) Inventors: Tamon Tanaka, Osaka (JP); Koichi Funaki, Osaka (JP); Hirozumi Kuwabara, Osaka (JP); Soichiro Watanabe, Osaka (JP); Yoshitaka Taira, Osaka (JP); Tetsuya Kosaka, Osaka (JP); Satoshi Inayama, Osaka (JP)

(73) Assignee: Kubota Corporation, Osaka-Shi, Osaka (JP)

( * ) Notice: Subject to any disclaimer, the term of this patent is extended or adjusted under 35 U.S.C. 154(b) by 0 days.

(21) Appl. No.: 14/462,663

(22) Filed: Aug. 19, 2014

(65) Prior Publication Data
US 2015/0184566 A1 Jul. 2, 2015

(30) Foreign Application Priority Data

Dec. 26, 2013 (JP) ................... 2013-268348

(51) Int. Cl.
*F01N 13/08* (2010.01)
*F01N 3/035* (2006.01)
(Continued)

(52) U.S. Cl.
CPC .............. *F01N 3/035* (2013.01); *F01N 3/021* (2013.01); *F01N 3/2066* (2013.01); *F01N 13/009* (2014.06); *F01N 13/1805* (2013.01);
(Continued)

(58) Field of Classification Search
CPC ...... F01N 3/021; F01N 3/2066; F01N 3/208; F01N 13/009; F01N 13/1811; F01N 2250/02; F01N 2340/04; F01N 2470/18; F01N 2610/02; F01N 2610/1453
USPC .......... 60/286, 295, 296, 297, 301, 311, 322
See application file for complete search history.

(56) References Cited

U.S. PATENT DOCUMENTS

| 8,460,610 B2 * | 6/2013 | Silver ..................... F01N 3/035 422/171 |
| 2010/0031644 A1 | 2/2010 | Keane et al. |

(Continued)

FOREIGN PATENT DOCUMENTS

| EP | 0226088 A1 | 6/1987 |
| EP | 1026375 A2 | 8/2000 |

(Continued)

OTHER PUBLICATIONS

Extended European Search Report issued Feb. 2, 2015 in EP Application No. 14180589.5.

(Continued)

*Primary Examiner* — Jorge Leon, Jr.
(74) *Attorney, Agent, or Firm* — Panitch Schwarze Belisario & Nadel LLP

(57) ABSTRACT

It is an object of the present invention to provide a diesel engine in which an engine body, a DPF case and an SCR catalyst case can be placed compactly. In the diesel engine including the engine body, the DPF case and the SCR catalyst case, a DPF is accommodated in the DPF case and an SCR catalyst is accommodated in the SCR catalyst case, the DPF case and the SCR catalyst case are mounted on the engine body, the DPF case is supported by the engine body through an exhaust gas introducing pipe, and the SCR catalyst case is supported by the DPF case through an exhaust gas relay pipe.

4 Claims, 6 Drawing Sheets

(51) Int. Cl.
  *F01N 3/021* (2006.01)
  *F01N 13/00* (2010.01)
  *F01N 3/20* (2006.01)
  *F01N 13/18* (2010.01)

(52) U.S. Cl.
  CPC ............ *F01N3/208* (2013.01); *F01N 13/1811* (2013.01); *F01N 2250/02* (2013.01); *F01N 2340/04* (2013.01); *F01N 2470/18* (2013.01); *F01N 2590/08* (2013.01); *F01N 2610/02* (2013.01); *F01N 2610/1453* (2013.01); *Y02T 10/24* (2013.01)

(56) References Cited

U.S. PATENT DOCUMENTS

| | | | |
|---|---|---|---|
| 2010/0186381 A1 | 7/2010 | Charles et al. | |
| 2010/0186394 A1* | 7/2010 | Harrison | F01N 3/103 60/299 |
| 2010/0205945 A1* | 8/2010 | Kowada | F01N 3/035 60/297 |
| 2014/0102085 A1* | 4/2014 | Mori | E02F 9/0866 60/301 |
| 2014/0238767 A1* | 8/2014 | Numa | F01N 3/2066 180/309 |
| 2014/0290222 A1* | 10/2014 | Sawada | F01N 3/10 60/286 |
| 2014/0291058 A1* | 10/2014 | Nakagami | E02F 9/0891 180/309 |
| 2014/0299401 A1* | 10/2014 | Nakagami | E02F 9/0866 180/309 |
| 2014/0326527 A1* | 11/2014 | Harada | E02F 9/0866 180/309 |
| 2014/0348716 A1* | 11/2014 | Park | F01N 3/2066 422/171 |
| 2014/0352297 A1* | 12/2014 | Spengel | F01N 3/106 60/605.1 |

FOREIGN PATENT DOCUMENTS

| | | | | |
|---|---|---|---|---|
| EP | 2518290 A1 | 10/2012 | | |
| JP | 05-001529 | 1/1993 | | |
| JP | 2007046599 A | 2/2007 | | |
| JP | 2011-032946 A | 2/2011 | | |
| JP | 201324107 | 2/2013 | | |
| KR | WO 2013103169 | * | 7/2013 | .......... F01N 3/2066 |
| WO | 2009041104 A1 | 4/2009 | | |

OTHER PUBLICATIONS

Office Action issued Jul. 12, 2016 in JP Application No. 2013-268348.

* cited by examiner

DIESEL ENGINE

BACKGROUND OF THE INVENTION (1) Field of the Invention

The present invention relates to a diesel engine, and more particularly, to a diesel engine in which an engine body, a DPF case and an SCR catalyst case can be placed compactly.

(2) Description of Related Art

As conventional diesel engines, there is a diesel engine including an engine body, a DPF case and an SCR catalyst case, in which a DPF is accommodated in the DPF case, and an SCR catalyst is accommodated in the SCR catalyst case (see Japanese Patent Application No. 2011-32946 (FIG. 1) for example).

The engine of this kind has a merit that the DPF traps PM in exhaust gas, and it is possible to reduce NOx in exhaust gas by the SCR catalyst.

However, the diesel engine of Japanese Patent Application No. 2011-32946 has a problem because the engine body, the DPF case and the SCR catalyst case are placed such that they stay away from one another.

BRIEF SUMMARY OF THE INVENTION

<<Problem>> The engine body, the DPF case and the SCR catalyst case cannot be placed compactly.

According to the diesel engine of Japanese Patent Application No. 2011-32946, since the engine body, the DPF case and the SCR catalyst case are placed such that they stay away from one another, the engine body, the DPF case and the SCR catalyst case cannot be placed compactly.

It is an object of the present invention to provide a diesel engine in which an engine body, a DPF case and an SCR catalyst case can be placed compactly.

Means for Solving the Problem

A matter to define the invention is as follows.

As illustrated in FIGS. 1 to 5, a diesel engine including an engine body 1, a DPF case 2 and an SCR catalyst case 3, in which a DPF 4 is accommodated in the DPF case 2 and an SCR catalyst 5 is accommodated in the SCR catalyst case 3, wherein the DPF case 2 and the SCR catalyst case 3 are mounted on the engine body 1, the DPF case 2 is supported by the engine body 1 through an exhaust gas introducing pipe 2a, and the SCR catalyst case 3 is supported by the DPF case 2 through an exhaust gas relay pipe 8.

Effect of the Invention

<<Effects>> It is possible to compactly place an engine body, a DPF case and an SCR catalyst case.

As illustrated in FIGS. 1 to 5, since the DPF case 2 and the SCR catalyst case 3 are mounted on the engine body 1, it is possible to compactly place the engine body 1, the DPF case 2 and the SCR catalyst case 3.

<<Effects>> It becomes easy to mount components on an engine-mounting machine.

As illustrated in FIGS. 1 to 5, since the DPF case 2 and the SCR catalyst case 3 are mounted on the engine body 1, if the engine body 1 is mounted on the engine-mounting machine, the DPF case 2 and the SCR catalyst case 3 are also collectively mounted on the engine-mounting machine. Therefore, it becomes easy to mount these components on the engine-mounting machine.

<<Effects>> It is possible to easily support the DPF case and the SCR catalyst case on the engine body.

As illustrated in FIGS. 1 to 5, the DPF case 2 is supported by the engine body 1 through an exhaust gas introducing pipe 2a, and the SCR catalyst case 3 is supported by the DPF case 2 through an exhaust gas relay pipe 8. Therefore, the exhaust gas introducing pipe 2a and the exhaust gas relay pipe 8 are effectively utilized as support members of the DPF case 2 and the SCR catalyst case 3, and it is possible to easily support the DPF case 2 and the SCR catalyst case 3 on the engine body 1.

<<Effects>> It is possible to compactly place the engine body, the DPF case and the SCR catalyst case.

As illustrated in FIG. 1, the DPF case 2 and the SCR catalyst case 3 are oriented to a direction which extends along a crankshaft center axis 19. Therefore, the engine body 1, the DPF case 2 and the SCR catalyst case 3 do not intersect with each other, and it is possible to compactly place the engine body 1, the DPF case 2 and the SCR catalyst case 3.

<<Effects>> It is possible to compactly place the engine body, the DPF case and the SCR catalyst case.

As illustrated in FIGS. 1, 4A and 5, the DPF case 2 and the SCR catalyst case 3 are arranged side by side and above the cylinder head cover 7. Therefore, it is possible to effectively utilize an empty space existing above the engine body 1, and it is possible to compactly place the engine body 1, the DPF case 2 and the SCR catalyst case 3.

<<Effects>> It is possible to compactly place the DPF case, the SCR catalyst case and straight pipe portions of a DPF-side exhaust gas relay pipe and an SCR exhaust gas relay pipe.

As illustrated in FIGS. 1 an 3, the straight pipe portion 12a of the DPF-side exhaust gas relay pipe 12 is placed along a peripheral wall of the DPF case 2 in a direction which extends along a longitudinal direction of the DPF case 2, and as illustrated in FIGS. 1 and 2, the straight pipe portion 13a of the SCR-side exhaust gas relay pipe 13 is placed along a peripheral wall of the SCR catalyst case 3 in a direction which extends along a longitudinal direction of the SCR catalyst case 3. Therefore, the DPF case 2, the SCR catalyst case 3 and the straight pipe portions 12a and 13a of the DPF-side exhaust gas relay pipe 12 and the SCR-side exhaust gas relay pipe 13 do not intersect with each other, and it is possible to compactly place the DPF case 2, the SCR catalyst case 3 and the straight pipe portions 12a and 13a of the DPF-side exhaust gas relay pipe 12 and the SCR-side exhaust gas relay pipe 13.

<<Effects>> It is possible to avoid inconvenience that crystal of urea aqueous solution conglutinates in the straight pipe portion.

As illustrated in FIGS. 1 to 5, the DPF case 2 and the SCR catalyst case 3 are sandwiched between the straight pipe portions 12a and 13a of the DPF-side exhaust gas relay pipe 12 and the SCR-side exhaust gas relay pipe 13 and the straight pipe portions 12a and 13a are placed lateral to the DPF case 2 and the SCR catalyst case 3. Therefore, it is possible to prevent the straight pipe portion 13a of the SCR-side exhaust gas relay pipe 13 from being excessively heated by radiation from the DPF case 2, and it is possible to avoid inconvenience that crystal of urea aqueous solution 18 conglutinates in the straight pipe portion 13a.

<<Effects>> It is possible to keep the height of the engine low.

As illustrated in FIGS. 1 to 5, the straight pipe portions 12a and 13a of the DPF-side exhaust gas relay pipe 12 and the SCR-side exhaust gas relay pipe 13 are placed on both right and left sides of the diesel engine such that the DPF case 2 and the SCR catalyst case 3 are sandwiched between the straight pipe portions 12a and 13a. Therefore, the straight pipe portions 12a and 13a do not largely project upward of the DPF case 2 and the SCR catalyst case 3, and it is possible to keep the height of the engine low.

<<Effects>> It is possible to restrain exhaust gas pressure from increasing.

By structures of an exhaust gas discharging pipe 2b of the DPF case 2, an exhaust gas introducing pipe 3a of the SCR catalyst case 3 and the exhaust gas relay pipe 8 illustrated in FIG. 1, it is possible to reduce resistance of exhaust gas sent from the DPF case 2 to the SCR catalyst case 3, and it is possible to prevent pressure of exhaust gas from increasing.

<<Effects>> It is possible to prevent distortion of various portions of pipes.

As illustrated in FIG. 1, both ends of the SCR-side exhaust gas relay pipe 13 are provided with slip joint portions 17, and as illustrated in FIG. 6, each of the slip joint portions 17 is fitted such that pipe portions 17a and 17b can expand, contract and slide in a longitudinal direction thereof, and the pipe portions 17a and 17b are fixed by a fastening portion 17c at predetermined expanding, contracting and sliding positions. Therefore, after the DPF case 2 and the SCR catalyst case 3 are mounted on the engine body 1, if a fastened degree of the slip joint portion 17 is loosened, it is possible to release stress in various portions of the pipes caused by twist or positional deviation, and to prevent distortion of the various portions of the pipes.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

FIGS. 1 to 6 are diagrams for describing a diesel engine according to an embodiment of the present invention. In this embodiment, a vertical type straight multicylinder diesel engine will be described.

A general outline of the engine is as follows.

Figure 2:
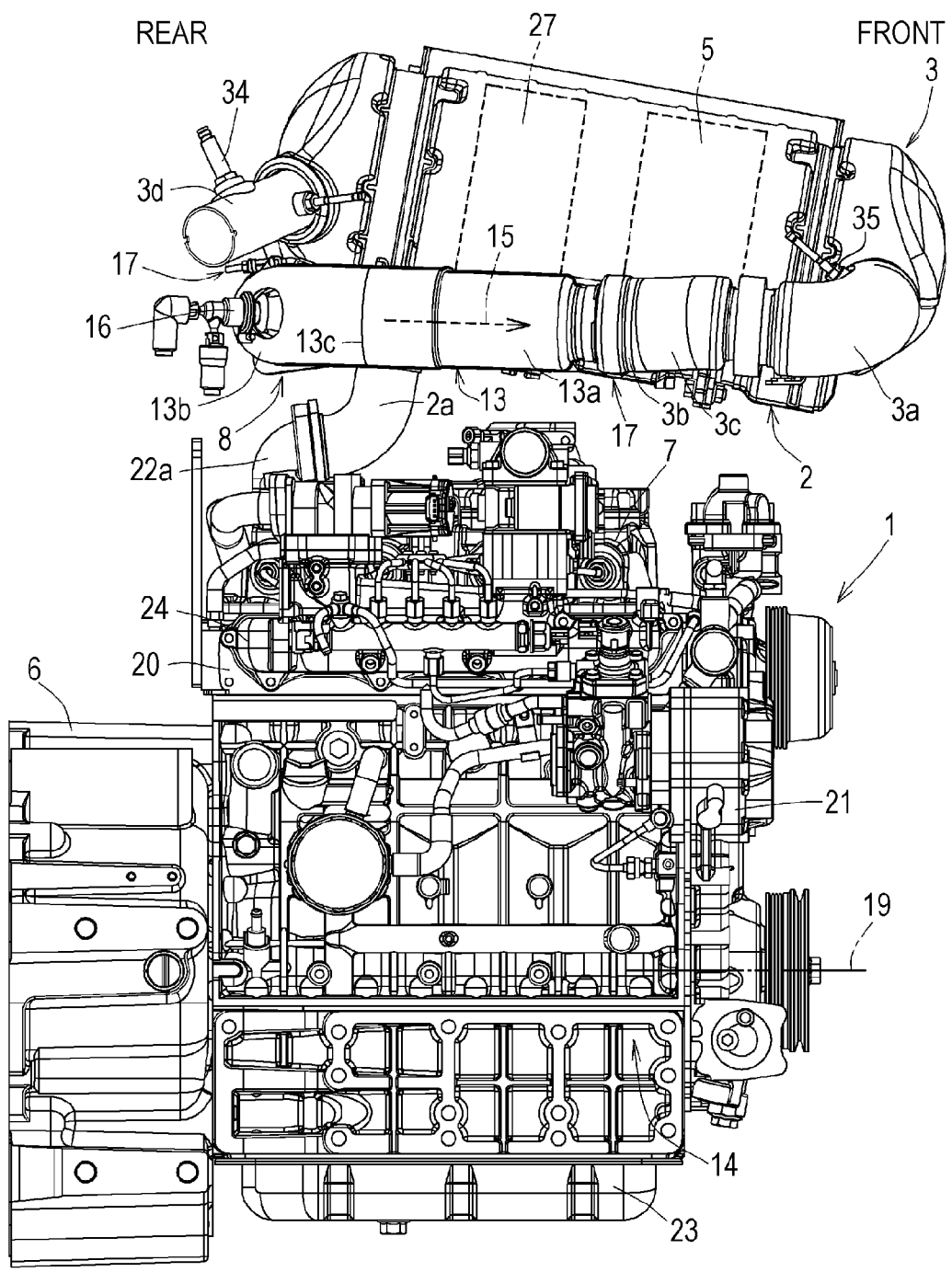
FIG. 2 is a right side view of the engine shown in FIG. 1.

As shown in FIG. 2, a cylinder head 20 is assembled into an upper portion of a cylinder block 14, a cylinder head cover 7 is assembled into an upper portion of the cylinder head 20, a gear case 21 is assembled into a front portion of the cylinder block 14, a flywheel housing 6 is assembled into a rear end of the cylinder block 14, and an oil pan 23 is assembled into a lower portion of the cylinder block 14.

Figure 3:
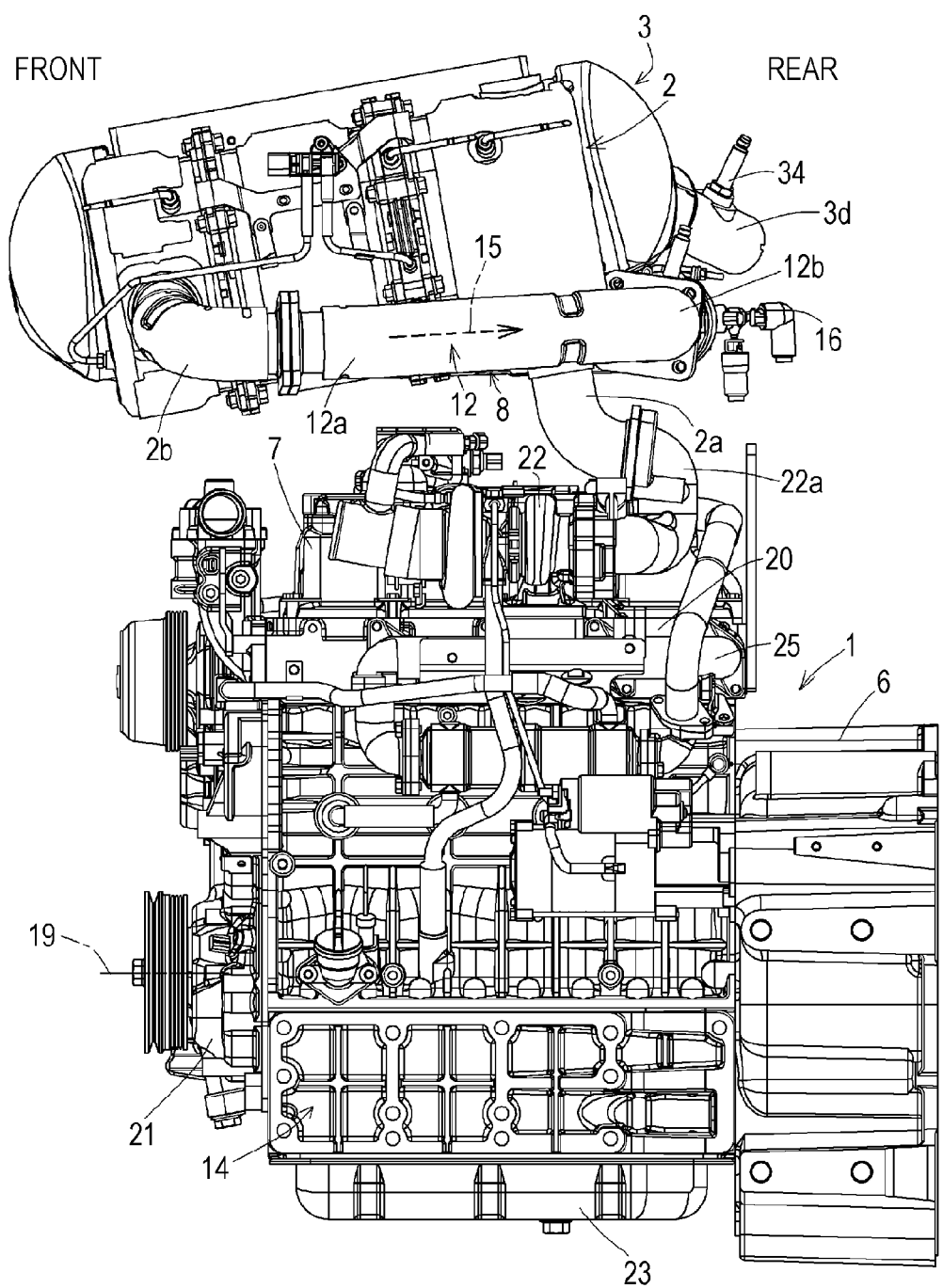
FIG. 3 is a left side view of the engine shown in FIG. 1.

An intake manifold 24 is assembled into one of lateral sides of the cylinder head 20 as shown in FIG. 2, and an exhaust manifold 25 is assembled into the other lateral side as shown in FIG. 3.

As shown in FIGS. 1 to 5, this engine includes an engine body 1, a DPF case 2 and an SCR catalyst case 3.

A DPF 4 is accommodated in the DPF case 2, and an SCR catalyst 5 is accommodated in the SCR catalyst case 3.

The DPF case 2 and the SCR catalyst case 3 are mounted on the engine body 1.

Figure 1:
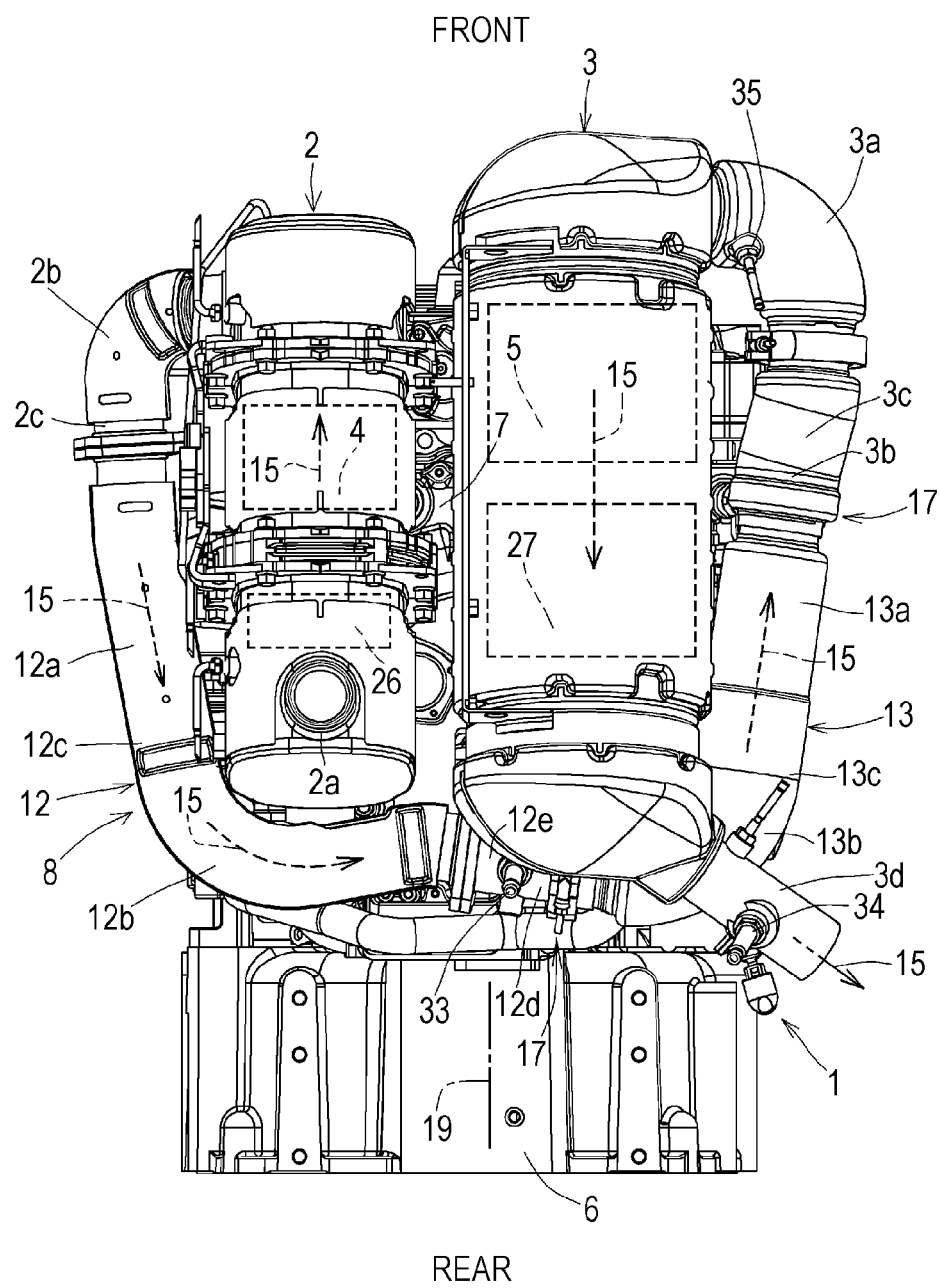
FIG. 1 is a plan view of a diesel engine according to an embodiment of the present invention.

As shown in FIG. 1, a DOC 26 is accommodated in the DPF case 2 on an upstream side, and the DPF 4 is accommodated in the DPF case 2 on a downstream side. The DPF is an abbreviation of a diesel particulate filter, and the DOC is an abbreviation of a diesel oxidation catalyst. The SCR catalyst 5 is accommodated in the SCR catalyst case 3 on the upstream side, and an oxidation catalyst 27 is accommodated in the SCR catalyst case 3 on the downstream side, thereby preventing ammonia from slipping. The SCR is an abbreviation of selective catalytic reduction.

As shown in FIGS. 1 to 5, the DPF case 2 is supported by the engine body 1 through an exhaust gas introducing pipe 2a, and the SCR catalyst case 3 is supported by the DPF case 2 through an exhaust gas relay pipe 8.

As shown in FIG. 1, the DPF case 2 and the SCR catalyst case 3 are oriented in a direction which extends along a crankshaft center axis 19.

Figure 4A:
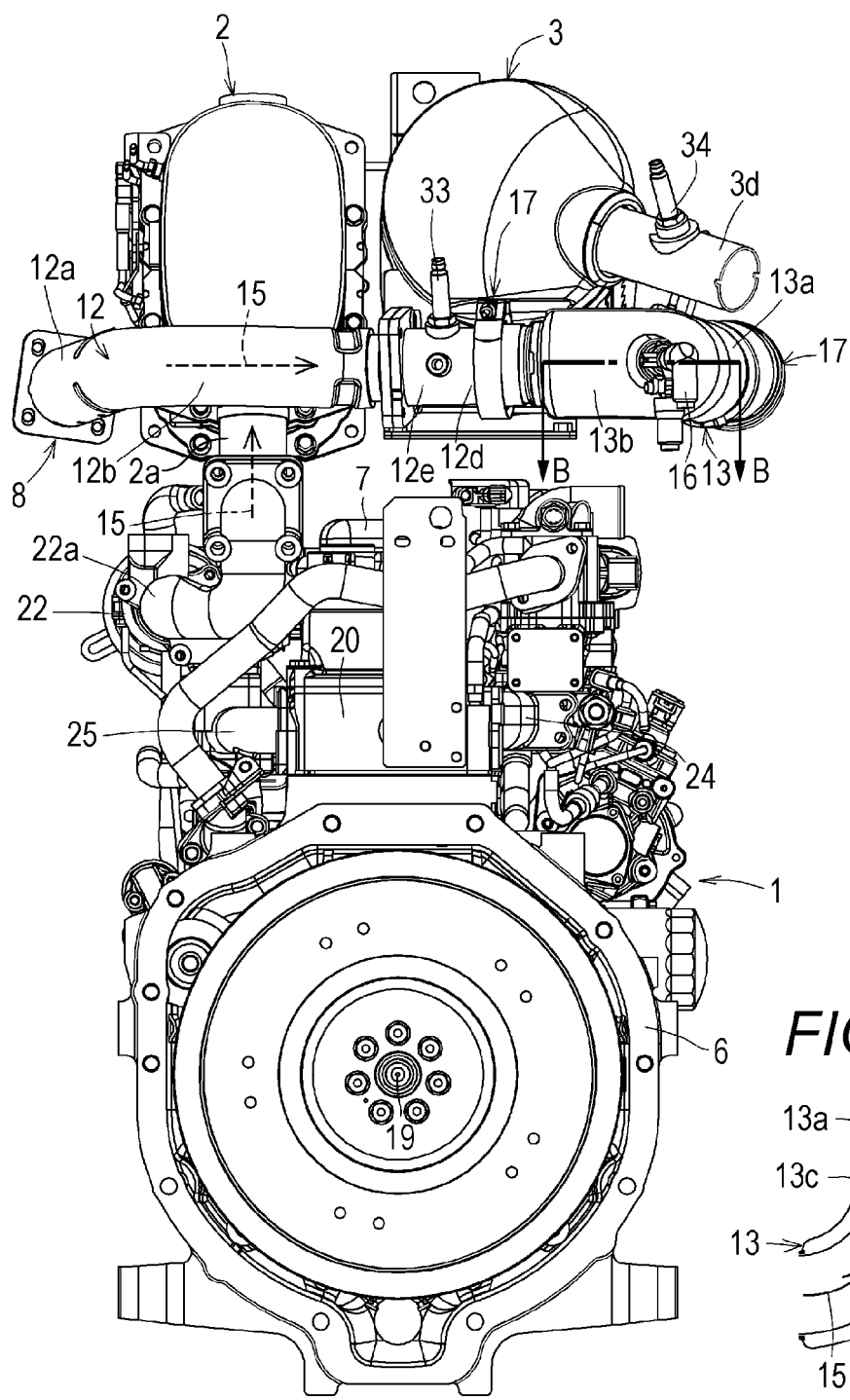
FIG. 4A is a back view of the engine shown in FIG. 1.
Figure 5:
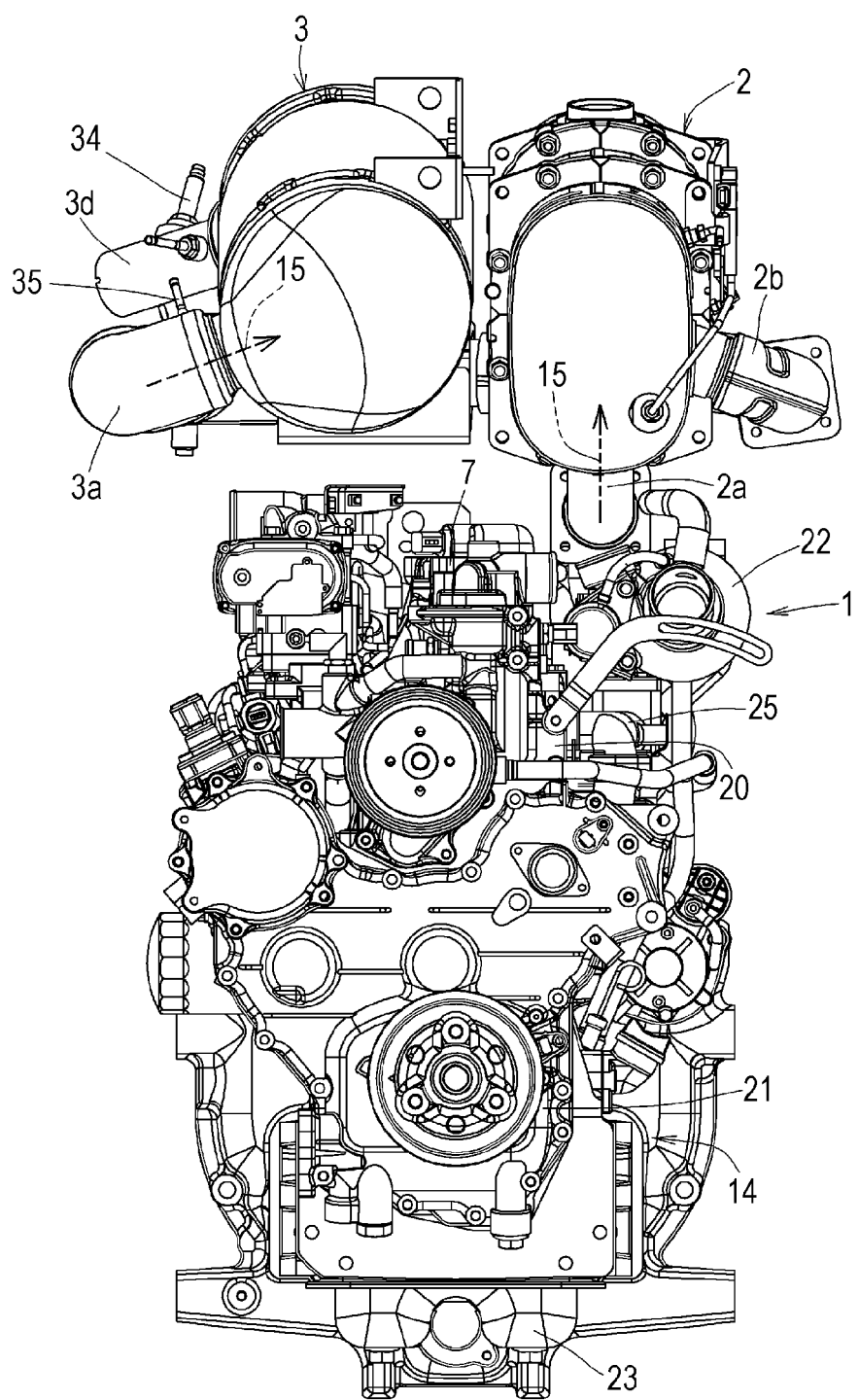
FIG. 5 is a front view of the engine shown in FIG. 1.
Figure 6:
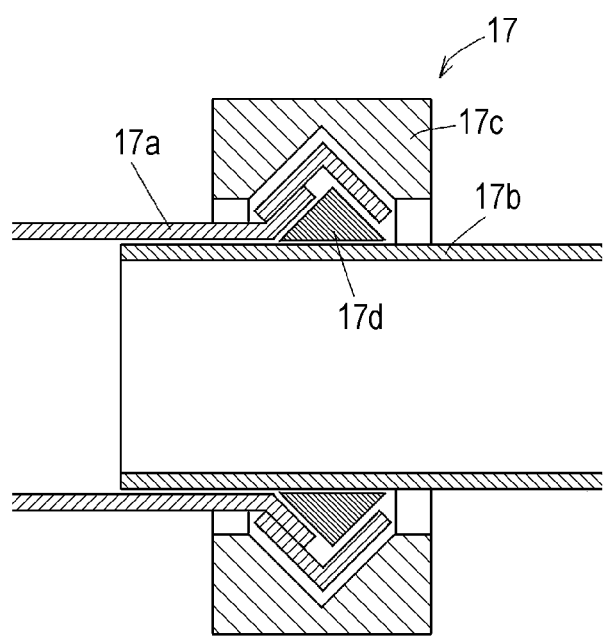
FIG. 6 is a diagram for describing a principle of a slip joint portion used in the engine shown in FIG. 1.

As shown in FIGS. 1, 4A and 5, if a width direction of the engine body 1 is defined as a lateral direction, the DPF case 2 and the SCR catalyst case 3 are arranged side by side and above the cylinder head cover 7.

As shown in FIG. 3, the exhaust gas introducing pipe 2a of the DPF case 2 rearwardly curves and extends from a lower surface of a peripheral wall of a rear portion of the DPF case 2. A supercharger 22 is mounted on an upper portion of an exhaust manifold 25, an exhaust gas discharging pipe 22a is provided on a rear portion of the supercharger 22, and the exhaust gas introducing pipe 2a of the DPF case 2 is mounted on the exhaust gas discharging pipe 22a of the supercharger 22. That is, the DPF case 2 is supported by the engine body 1 through the exhaust gas introducing pipe 2a of the DPF case 2, the exhaust gas discharging pipe 22a of a rear portion of the supercharger 22 and the supercharger 22.

According to this, the exhaust gas discharging pipe 22a and the supercharger 22 are effectively utilized as support members of the DPF case 2 and the SCR catalyst case 3.

As shown in FIG. 1, the exhaust gas relay pipe 8 is placed between an exhaust gas discharge pipe 2b of the DPF case 2 and an exhaust gas introducing pipe 3a of the SCR catalyst case 3. The exhaust gas relay pipe 8 includes a DPF-side exhaust gas relay pipe 12 and an SCR-side exhaust gas relay pipe 13.

As shown in FIG. 1, the DPF-side exhaust gas relay pipe 12 and the SCR-side exhaust gas relay pipe 13 respectively include straight pipe portions 12a and 13a. As shown in FIGS. 1 and 3, the straight pipe portion 12a of the DPF-side exhaust gas relay pipe 12 is placed along a peripheral wall of the DPF case 2 in a direction which extends along a longitudinal direction of the DPF case 2. As shown in FIGS. 1 and 2, the straight pipe portion 13a of the SCR-side exhaust gas relay pipe 13 is placed along a peripheral wall of the SCR catalyst case 3 in a direction which extends along a longitudinal direction of the SCR catalyst case 3.

Figure 4B:
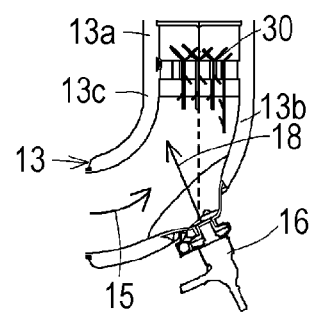
FIG. 4B is a sectional view taken along line B-B in FIG. 4A.

As shown in FIG. 4B, exhaust gas 15 discharged from the DPF case 2 and urea aqueous solution 18 injected from a urea aqueous solution injector 16 are mixed with each other in the straight pipe portion 13a of the SCR-side exhaust gas relay pipe 13.

As shown in FIGS. 1 to 5, the DPF case 2 and the SCR catalyst case 3 are sandwiched between the straight pipe portions 12a and 13a of the DPF-side exhaust gas relay pipe 12 and the SCR-side exhaust gas relay pipe 13 and the straight pipe portions 12a and 13a are placed lateral to the DPF case 2 and the SCR catalyst case 3.

As shown in FIG. 1, a direction of the crankshaft center axis 19 is defined as a longitudinal direction, the flywheel housing 6 is defined as existing on a rear side, and a width direction of the engine body 1 is defined as a lateral direction. Based on these definitions, the exhaust gas discharge pipe 2b of the DPF case 2 rearwardly curves and extends from a peripheral wall of a front end of the DPF case 2 on a side opposite from the SCR catalyst case 3.

The exhaust gas introducing pipe 3a of the SCR catalyst case 3 rearwardly curves and extends from a peripheral wall of a front end of the SCR catalyst case 3 on a side opposite from the DPF case 2.

The DPF-side exhaust gas relay pipe 12 includes the straight pipe portion 12a and a curved pipe portion 12b. The straight pipe portion 12a straightly extends rearward from an extending end 2c of the exhaust gas discharge pipe 2b of the DPF case 2. The curved pipe portion 12b laterally curves and extends from the extending end 12c of the straight pipe portion 12a toward the SCR catalyst case 3.

The SCR-side exhaust gas relay pipe 13 includes the straight pipe portion 13a and a curved pipe portion 13b. The curved pipe portion 13b forwardly curves and extends from the extending end 12d of the curved pipe portion 12b of the DPF-side exhaust gas relay pipe 12 toward the exhaust gas introducing pipe 3a of the SCR catalyst case 3. The straight pipe portion 13a straightly extends forward from an extending end 13c of the curved pipe portion 13b toward the extending end 3b of the exhaust gas introducing pipe 3a of the SCR catalyst case 3.

As shown in FIG. 1, the curved pipe portion 12b of the DPF-side exhaust gas relay pipe 12 includes a straight pipe-shaped extension portion 12e, and an inlet-side NOx sensor 33 is mounted on the extension portion 12e. As shown in FIG. 2, the urea aqueous solution injector 16 is mounted on the curved pipe portion 13b of the SCR-side exhaust gas relay pipe 13. As shown in FIG. 1, the exhaust gas introducing pipe 3a of the SCR catalyst case 3 includes a straight pipe-shaped extension portion 3c. An exhaust gas temperature sensor 35 is mounted on the exhaust gas introducing pipe 3a of the SCR catalyst case 3. An outlet-side NOx sensor 34 is mounted on an exhaust gas introducing pipe 3d of the SCR catalyst case 3.

As shown in FIG. 1, the curved pipe portion 12b of the DPF-side exhaust gas relay pipe 12 includes a straight pipe-shaped extension portion 12e, and an inlet-side NOx sensor 33 is mounted on the extension portion 12e. As shown in FIG. 2, the urea aqueous solution injector 16 is mounted on the curved pipe portion 13b of the SCR-side exhaust gas relay pipe 13. As shown in FIG. 1, the exhaust gas introducing pipe 3a of the SCR catalyst case 3 includes a straight pipe-shaped extension portion 3c. An exhaust gas temperature sensor 35 is mounted on the exhaust gas introducing pipe 3a of the SCR catalyst case 3. An outlet-side NOx sensor 34 is mounted on an exhaust gas discharge pipe 3d of the SCR catalyst case 3.

The fastening portion 17c fastens and fixes the pipe portions 17a and 17b by a fastening band. A space between the pipe portions 17a and 17b is sealed by a gasket 17d.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A diesel engine comprising an engine body, a DPF case and an SCR catalyst case, a DPF accommodated in the DPF case and an SCR catalyst accommodated in the SCR catalyst case, a DPF-side exhaust gas relay pipe and an SCR-side exhaust gas relay pipe, the DPF-side exhaust gas relay pipe and the SCR-side exhaust gas relay pipe respectively including straight pipe portions, wherein the DPF case and the SCR catalyst case are mounted on the engine body and the DPF case and the SCR catalyst case are oriented in a direction which extends along a crankshaft center axis, the DPF case is supported by the engine body through an exhaust gas introducing pipe, and the SCR catalyst case is supported by the DPF case through an exhaust gas relay pipe, the exhaust gas relay pipe is placed between an exhaust gas discharge pipe of the DPF case and an exhaust gas introducing pipe of the SCR catalyst case, the straight pipe portion of the DPF-side exhaust gas relay pipe is placed along a peripheral wall of the DPF case in a direction which extends along a longitudinal direction of the DPF case, and the straight pipe portion of the SCR-side exhaust gas relay pipe is placed along a peripheral wall of the SCR catalyst case in a direction which extends along a longitudinal direction of the SCR catalyst case, when a width direction of the engine body is defined as a lateral direction, exhaust gas discharged from the DPF case and urea aqueous solution injected from a urea aqueous solution injector are mixed with each other in the straight pipe portion of the SCR-side exhaust gas relay pipe, the DPF case and the SCR catalyst case are arranged side by side in a lateral direction and sandwiched between the straight pipe portions of the DPF-side exhaust gas relay pipe and the SCR-side exhaust gas relay pipe and the straight pipe portions are placed on opposite sides from each other in the lateral direction, the straight pipe portion of the SCR-side exhaust gas relay pipe is arranged on an opposite side from the DPF case in the lateral direction, and the SCR catalyst case is sandwiched between the straight pipe portion of the SCR-side exhaust gas relay pipe and the DPF case; and when a direction of the crankshaft center axis is defined as a longitudinal direction and a flywheel housing is defined as existing on a rear side, the exhaust gas discharge pipe of the DPF case rearwardly curves and extends from a peripheral wall of a front end of the DPF case on a side opposite from the SCR catalyst case, the exhaust gas introducing pipe of the SCR catalyst case rearwardly curves and extends from a peripheral wall of a front end of the SCR catalyst case on a side opposite from the DPF case, the DPF-side exhaust gas relay pipe comprises the straight pipe portion and a curved pipe portion, the straight pipe portion straightly extends rearward from an extending end of the exhaust gas discharge pipe of the DPF case, the curved pipe portion laterally curves and extends from an extending end of the straight pipe portion toward the SCR catalyst case, the SCR-side exhaust gas relay pipe comprises the straight pipe portion and a curved pipe portion, the curved pipe portion forwardly curves and extends from an extending end of the curved pipe portion of the DPF-side exhaust gas relay pipe toward the exhaust gas introducing pipe of the SCR catalyst case, and the straight pipe portion straightly extends forward from an extending end of the curved pipe portion toward an extending end of the exhaust gas introducing pipe of the SCR catalyst case.

2. The diesel engine according to claim 1, wherein the DPF case and the SCR catalyst case are arranged above a cylinder head cover.

3. The diesel engine according to claim 2, wherein both ends of the SCR-side exhaust gas relay pipe are provided with slip joint portions, each of the slip joint portions is fitted such that pipe portions can expand, contract and slide in a longitudinal direction thereof, and the pipe portions are fixed by a fastening portion at predetermined expanding, contracting and sliding positions.

4. The diesel engine according to claim 1, wherein both ends of the SCR-side exhaust gas relay pipe are provided with slip joint portions, each of the slip joint portions is fitted such that pipe portions can expand, contract and slide in a longitudinal direction thereof, and the pipe portions are fixed by a fastening portion at predetermined expanding, contracting and sliding positions.

\* \* \* \* \*